(12) United States Patent
Lüssi et al.

(10) Patent No.: US 6,253,667 B1
(45) Date of Patent: Jul. 3, 2001

(54) ASSEMBLY FOR PREPARING HOT AND FROTHED MILK

(75) Inventors: Andre Lüssi, Wabern (CH); Petrus Josephus Carolus Piscaer, Rotterdam; Jan Anne Muis, Odijk, both of (NL)

(73) Assignee: Sara Lee/DE N.V., Utrecht (NL)

( * ) Notice: Subject to any disclaimer, the term of this patent is extended or adjusted under 35 U.S.C. 154(b) by 0 days.

(21) Appl. No.: 08/837,675

(22) Filed: Apr. 22, 1997

(30) Foreign Application Priority Data

Apr. 24, 1996 (NL) .................................................. 1002936

(51) Int. Cl.[7] .............................. A47J 31/40; A47J 31/42; A47J 31/44
(52) U.S. Cl. ................................ 99/455; 99/275; 99/293; 99/323.1; 99/453; 261/142; 261/DIG. 16
(58) Field of Search ............................... 99/452–455, 275, 99/293, 323.1, 323.3; 366/101, 163.2, 139, 165.2; 261/75, 79.2, 93, 62, DIG. 7, DIG. 16, DIG. 76, 142; 137/889, 893; 426/477

(56) References Cited

U.S. PATENT DOCUMENTS

| | | | |
|---|---|---|---|
| 4,304,741 | * | 12/1981 | Avison et al. ..................... 99/323.1 |
| 4,715,274 | * | 12/1987 | Paoletti ................................ 99/454 |
| 4,735,133 | * | 4/1988 | Paoletti ................................ 99/454 |
| 4,852,473 | * | 8/1989 | Azpitarte Bolivar ........... 99/323.1 X |
| 4,852,474 | * | 8/1989 | Mahlich et al. .............. 261/DIG. 76 |
| 5,052,289 | * | 10/1991 | Di Girolamo ........................ 99/452 |
| 5,189,949 | * | 3/1993 | Apa ...................................... 99/453 |
| 5,265,520 | * | 11/1993 | Giuliano ........................... 99/323.1 |
| 5,330,266 | * | 7/1994 | Stubaus ............................... 366/101 |
| 5,339,725 | * | 8/1994 | De'Longhi ........................... 99/293 |
| 5,423,245 | * | 6/1995 | Midden ............................ 99/453 X |
| 5,638,740 | * | 6/1997 | Cai ....................................... 99/295 |
| 5,738,002 | * | 4/1998 | Marano-Ducarne .................. 99/293 |

FOREIGN PATENT DOCUMENTS 0 472 272 A2   6/1991  (EP) .
WO 91/00041   1/1991  (WO) .

* cited by examiner

Primary Examiner—Timothy F. Simone
(74) Attorney, Agent, or Firm—Welsh & Katz, Ltd.

(57) ABSTRACT

An emulsifying assembly comprising a milk supply duct and a mixing device for mixing at least steam and milk for preparing hot milk for cappuccino and similar beverages. The mixing device comprises at least one steam inlet, at least one milk inlet and an outlet while a first end of the milk supply duct is connected to the at least one milk inlet, a second open end of the at least one milk supply duct is situated at a height lower than the highest point of the at least one milk supply duct, while further, in use, the second open end of the milk supply duct is in fluid communication with a milk-filled milk container. The emulsifying assembly further comprises an aeration valve which is connected to the at least one milk supply duct, and with which the at least one milk supply duct can be aerated when the aeration valve is in its opened position. The milk container is placed in a cooling unit. The milk supply duct extends substantially inside the cooling unit.

35 Claims, 15 Drawing Sheets

ASSEMBLY FOR PREPARING HOT AND FROTHED MILK

This invention relates to an assembly for preparing hot milk, more particularly for preparing frothed milk, at least comprising at least one milk supply duct with a first and second open end and a mixing device for at least mixing steam and milk for preparing hot milk for cappuccino and similar beverages, the mixing device comprising at least one steam inlet, at least one milk inlet and an outlet, while a first end of the at least one milk supply duct is connected to the at least one milk inlet, a second end of the at least one milk supply duct is disposed at a height lower than the highest point of the at least one milk supply duct, while further in use the second end of the at least one milk supply duct is in fluid communication with a milk-filled milk container.

BACKGROUND OF THE INVENTION

Such an assembly is known from international patent application WO91/00041. In this known assembly, the mixing device consists of an emulsifier which, in addition to the milk inlet and the steam inlet, further comprises an air inlet. The steam inlet, air inlet and the milk inlet open into a suction chamber. Further, the known emulsifier comprises a mixing chamber which is in fluid communication with the suction chamber. The mixing chamber in turn is in communication with an outlet of the emulsifier. When steam is supplied to the steam inlet under high pressure, this will create a reduced pressure in the suction chamber. As a result, milk will be sucked in via the milk inlet and air will be sucked in via the air inlet. The thus sucked-in milk and air then move together with the steam to the mixing chamber. In the mixing chamber, frothed milk is formed which leaves the emulsifier via the outlet referred to. This frothed milk can be used for preparing cappuccino. In the known assembly, a problem occurs in that it is found that the heated milk that is dispensed is not always entirely pure. The heated milk has been found to contain traces of bad milk. As a result, the quality of the heated milk greatly deteriorates, so that the taste, the colour and the appearance of the milk dispensed are adversely affected. This may also be unhealthy. However, in the catering industry regulations may apply or may do so in the future, that impose minimum requirements regarding the quality of the milk dispensed by an emulsifying assembly.

SUMMARY OF THE INVENTION

One object of the invention is to provide a solution to the above-mentioned problem and moreover to provide an assembly that can always satisfy the highest quality requirements.

An assembly according to a first aspect of the invention is characterized in that the assembly further comprises at least one aeration valve which is connected to the at least one milk supply duct, the at least one milk supply duct being aerated when the aeration valve is in its opened position.

This aspect of the invention is based on the insight that milk residues may be left behind in the milk supply duct when an amount of heated milk is prepared using the assembly. When subsequently the assembly is not used for some time, these milk residues will gradually go bad. Subsequently, when the assembly is set into operation again after some time, milk flowing through the milk supply duct will carry along these residues of bad milk. These residues will then end up in the milk dispensed by the assembly. It is clear that the quality of the dispensed milk will greatly deteriorate as a result. In accordance with the invention, the aeration valve can be opened after an amount of heated milk has been dispensed with the aid of the assembly. By opening the aeration valve, the milk supply duct is aerated, with the result that milk residues left behind in the milk supply duct will drain from this duct. A part of the milk will flow back to the milk container, while another part of the milk will flow to the mixing device. The mixing device can be made of such design that this milk leaves the mixing device via its outlet.

The aeration valve can be operated by hand. It is also possible, however, to operate the aeration valve automatically with the aid of a control signal.

The aeration valve additionally provides a number of other particular advantages. The above-mentioned known apparatus has, for instance, a further drawback in that the assembly may continue to dispense milk when no steam is being supplied to the steam inlet anymore. This is caused by so-called siphon action in the milk supply duct. When the first end of the milk supply duct is situated, for instance, below the liquid level in the milk container, the milk container, once the milk flow has been set in motion, will drain of itself. In accordance with the invention, this siphon action can be interrupted by opening the aeration valve, so that the milk supply duct is aerated. The opening of the aeration valve can again be carried out after the steam supply to the steam inlet has been stopped. Again, the aeration valve is preferably operated automatically, for instance by means of a control unit which also controls a steam generator which generates steam whereupon the steam is supplied to the steam inlet. However, the aeration valve also opens other possibilities for application. Thus it is possible to heat up the mixing device before it is used to generate heated milk. To that end, first the aeration valve is opened. Then steam is supplied to the steam inlet. Owing to the aeration valve being opened, the mixing device will not be able to suck in any milk via the milk supply duct. However, the steam will heat up the mixing device. When thereafter the mixing device has been heated up sufficiently, the aeration valve can be closed, so that milk is sucked in via the milk supply duct. The result is that hot milk is dispensed whose temperature is constant over time. This also serves the purpose of the invention, viz. improving the quality of the milk dispensed. This last is also the case when someone uses the aeration valve according to the invention for cleaning the mixing device. In doing so, any milk residues left behind in the mixing device are removed and hence are not given an opportunity to go bad. To that end, the aeration valve is opened so that the milk supply duct is aerated. Then under high pressure steam is supplied to the steam inlet. Owing to the aeration valve being opened, no milk will be sucked in through the milk supply duct, but the steam will flow through the mixing device and thereby entrain any milk residues. The steam together with any milk residues will thereafter leave the mixing device through the outlet of the mixing device. The result is that the entire mixing device is blown clean. In this way too, therefore, the quality of the milk dispensed will be improved compared with that dispensed by the known apparatus. Additionally, the aeration valve can be used for cleaning the supply duct itself. To that end, the aeration valve is opened again and, for instance via the aeration valve or via one of the open ends of the milk supply duct, steam is supplied to the milk supply duct for cleaning this duct.

In particular, the assembly further comprises a steam generator which is connected to the steam inlet, and a control unit which controls the aeration valve and the steam generator. The control unit, for the purpose of preparing the heated milk, will close the aeration valve, so that the milk supply duct is not aerated by the aeration valve, and activate the steam generator for supplying steam to the mixing device. After sufficient milk has been dispensed, the control unit will deactivate the steam generator and open the aeration valve to prevent the siphon action referred to. Then the control unit, before heated milk is dispensed again, will open the aeration valve, insofar as it has not been opened yet, and activate the steam generator for supplying steam to the mixing device, without milk being sucked in via the milk supply duct, for the purpose of preheating and/or cleaning the mixing device.

According to another aspect of the invention, whereby the object of the invention is likewise achieved, the assembly comprises a cooling device in which a milk-filled container can be arranged for dispensing cooled milk, a mixing device with at least one steam inlet and a milk inlet to which in use steam and milk, respectively, are supplied for obtaining heated milk, and an outlet for dispensing the milk heated with the steam, the assembly further comprising at least one milk supply duct with a first and second open end, while the first end is connected to the milk inlet and, in use, the second end is in fluid communication with the milk in the container, characterized in that the cooling device comprises a cooling unit comprising a cooled space surrounded by chamber walls, in which space the milk container can be placed, while the at least one milk supply duct extends substantially inside the cooling unit.

Owing to the fact that in accordance with the invention the milk supply duct extends substantially within the cooling unit, the milk supply duct itself will be cooled. As a consequence, the at least one milk supply duct will be unsusceptible to bacterial growth. In other words, any milk residues left behind in the milk supply duct will not go bad so soon. Accordingly, this will likewise effect a further improvement of the quality of the milk dispensed. In this connection, it is noted that in the known apparatuses the milk supply duct is not cooled. Moreover, in the apparatus according to the above-mentioned international patent application WO91/000041 the milk container itself is not cooled either.

Another advantage of the cooled milk-filled container and the cooled at least one milk supply duct is that in this way always milk of a constant temperature is supplied to the mixing device. This means that, in contrast with the known apparatuses, the milk supplied to the mixing device is not subject to any temperature fluctuations which might translate into temperature fluctuations in the heated milk dispensed by the mixing device. For this reason too, therefore, the quality of the milk dispensed is further improved.

It is noted that the mixing device preferably consists of an emulsifier which, in addition to the milk inlet and the steam inlet, comprises an air inlet, a suction chamber and a whirl chamber. The air inlet, the steam inlet and the milk inlet open into the suction chamber. The suction chamber is in fluid communication with the whirl chamber. The whirl chamber is in fluid communication with the outlet referred to. Such an emulsifier is suitable for directly dispensing heated frothed milk. However, it is also possible that the mixing device comprises no air inlet or an air inlet that can be shut off. In that case, only heated milk will be dispensed. This heated milk can, if desired, be further processed later in a known manner for obtaining frothed milk.

According to a highly particular embodiment of the assembly, the mixing device consists of an emulsifier comprising a first and second steam inlet, a first and second milk inlet, a first and second suction chamber, an air inlet and a mixing chamber, while the first steam inlet, the air inlet and the first milk inlet open into the first suction chamber, the first suction chamber is in fluid communication with the mixing chamber for preparing hot, frothed milk under supply of steam to the first steam inlet and, further, the second steam inlet and the second milk inlet open into the second suction chamber, and the second suction chamber is in fluid communication with the mixing chamber for preparing hot, non-frothed milk under supply of steam to the second steam inlet. Such an assembly has as an advantage that again the quality of the heated milk dispensed is improved. When it is desired, for instance, to dispense frothed milk, steam is supplied to the first steam inlet. When, however, it is desired to dispense heated milk which, however, should not froth at all, steam can be supplied to the second steam inlet. Inasmuch as the second suction chamber is not in communication with the air inlet, no air will be sucked into the second suction chamber, with the result that no frothed milk can be generated. The invention will now be further elucidated with reference to the accompanying drawings, wherein:

CONCISE DESCRIPTION OF THE DRAWINGS

FIG. 2e is a top plan view of the emulsifying assembly according to FIG. 2a;

FIG. 3a is a side elevation of a first embodiment of an emulsifier of the emulsifying assembly according to FIG. 2a;

FIG. 3b is a partly broken away front view of the emulsifier according to FIG. 3a;

FIG. 3d is a top plan view of the emulsifier according to FIG. 3a;

FIG. 3e is a perspective view of the emulsifier of FIG. 3a;

FIG. 3f is a three-dimensional view of a partly exploded emulsifier according to FIG. 3a;

FIG. 5a is a side elevation of a second embodiment of an emulsifier of the emulsifying assembly according to FIG. 2a;

FIG. 5b is a partly broken-away front view of the emulsifier according to FIG. 5a;

FIG. 5c is a cross section of the emulsifier taken on the line 5c—5c in FIG. 5a;

FIG. 5d is a top plan view, partly transparent, of the emulsifier according to FIG. 5a;

FIG. 5e is a perspective view of the emulsifier of FIG. 5a;

FIG. 5f is a three-dimensional view of a partly exploded emulsifier according to FIG. 5a;

DETAILED DESCRIPTION OF THE INVENTION

Figure 1A:
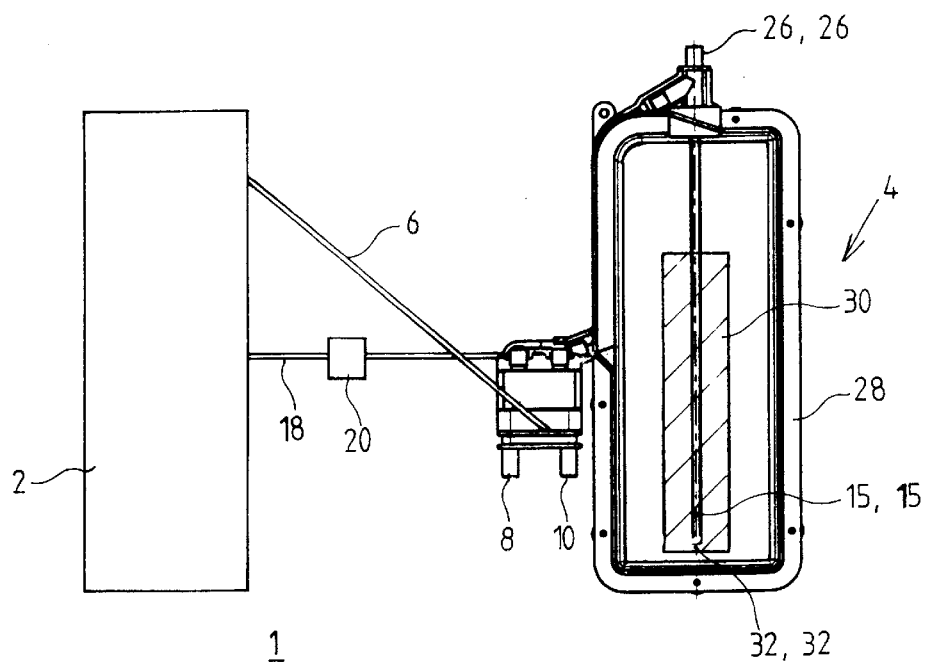
FIG. 1a is a front view of a coffee apparatus for preparing cappuccino and similar beverages.
Figure 1B:
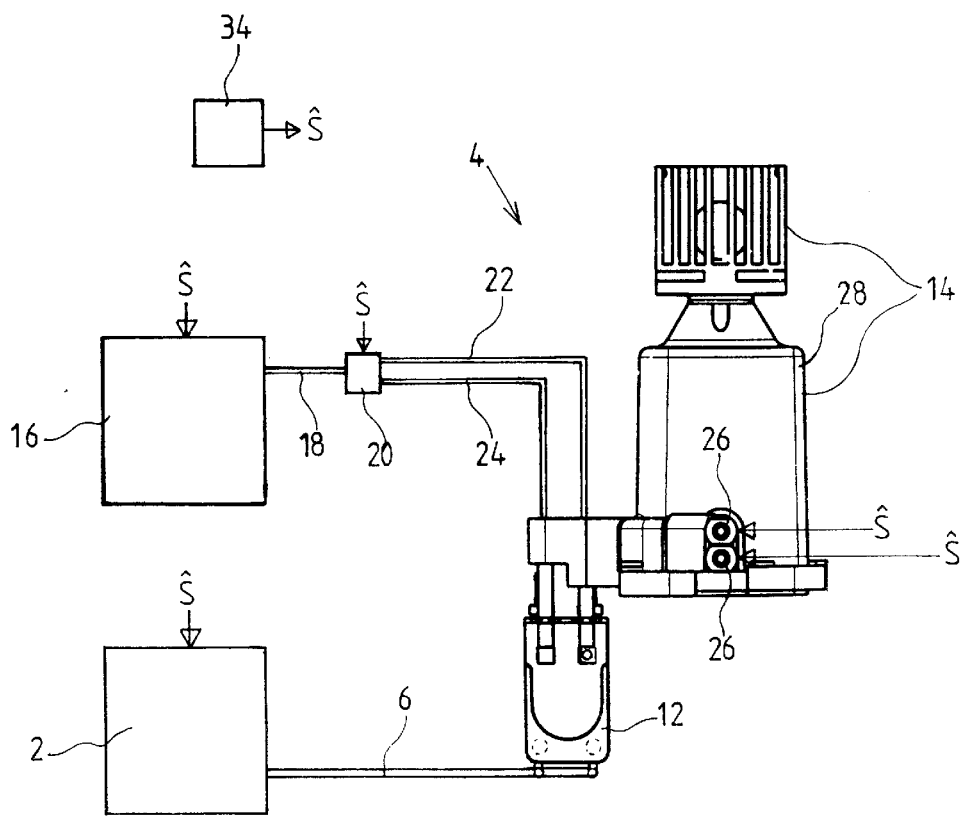
FIG. 1b is a top plan view of the coffee apparatus according to FIG. 1.

In FIGS. 1a and 1b, reference numeral 1 designates a coffee apparatus for preparing cappuccino and similar beverages. It comprises a coffee unit 2 for preparing a coffee extract and an emulsifying assembly 4 for preparing, as desired, heated frothed milk and heated non-frothed milk. The coffee unit 2 comprises a discharge channel 6 which comprises a first outflow 8 and a second outflow 10. The emulsifying assembly 4 comprises a mixing device 12 suitable for mixing steam and milk for obtaining heated milk. In this example, the mixing device further comprises an air inlet for additionally adding air to the milk for obtaining heated frothed milk. In this example, the mixing device consists of an emulsifier and accordingly will be designated hereinafter as emulsifier 12.

The emulsifying assembly further comprises a cooling device 14 in which a milk-filled container can be arranged for dispensing cooled milk. This cooled milk is supplied via a first or second milk supply duct 15a, 15b, to be discussed hereinafter, to a first or second milk inlet of the emulsifier 12.

The emulsifying assembly further comprises a steam generator 16 which dispenses steam via a steam duct 18 to a selection means 20. The selection means 20, settable as desired, dispenses the steam supplied by the steam generator 16 via the steam duct 18 to a first downstream duct 22 or a second downstream duct 24.

The first milk supply duct 15a further comprises an aeration valve 26a while the second milk supply duct 15b comprises an aeration valve 26b. The aeration valve 26a and 26b in this example are arranged on top of the cooling device 14. The cooling device 14 consists in this example of a cooling unit 28, which comprises a cooled space surrounded by chamber walls, in which space the milk container mentioned can be placed. This milk container is, for instance, a carton of milk 30, as shown in hatching in FIG. 1a. The milk supply ducts 15a and 15b comprise a second open end 32a, 32b which is in fluid communication with the milk disposed in the milk carton 30. In this example the two open ends 32a and 32b are situated nearly on the bottom of the carton of milk.

Finally, the emulsifying assembly further comprises a control unit 34 which generates control signals S and, through them, controls the coffee unit 2, the steam generator 16, the selection means 20 and the aeration valves 26a and 26b.

In this example the walls of the cooling unit 28 are made substantially of a metal. The emulsifying assembly further comprises a cooling element 36 known per se, with which the walls of the cooling unit 28 can be cooled. A further elaboration of the cooling device 14 will now be discussed with reference to FIG. 2. The cooling unit 28 comprises a bottom wall 38, upright sidewalls 40a, 40b, 40c, 40d, and a top wall 42. The sidewall 40d is detachably connected with the rest of the cooling unit 28 and can, for instance, be removed to place in the space 44 surrounded by the chamber walls 40a, 40b, 40c, 40d, 38 and 42 a milk-filled container in the form of a carton of milk 30.

Figure 2A:
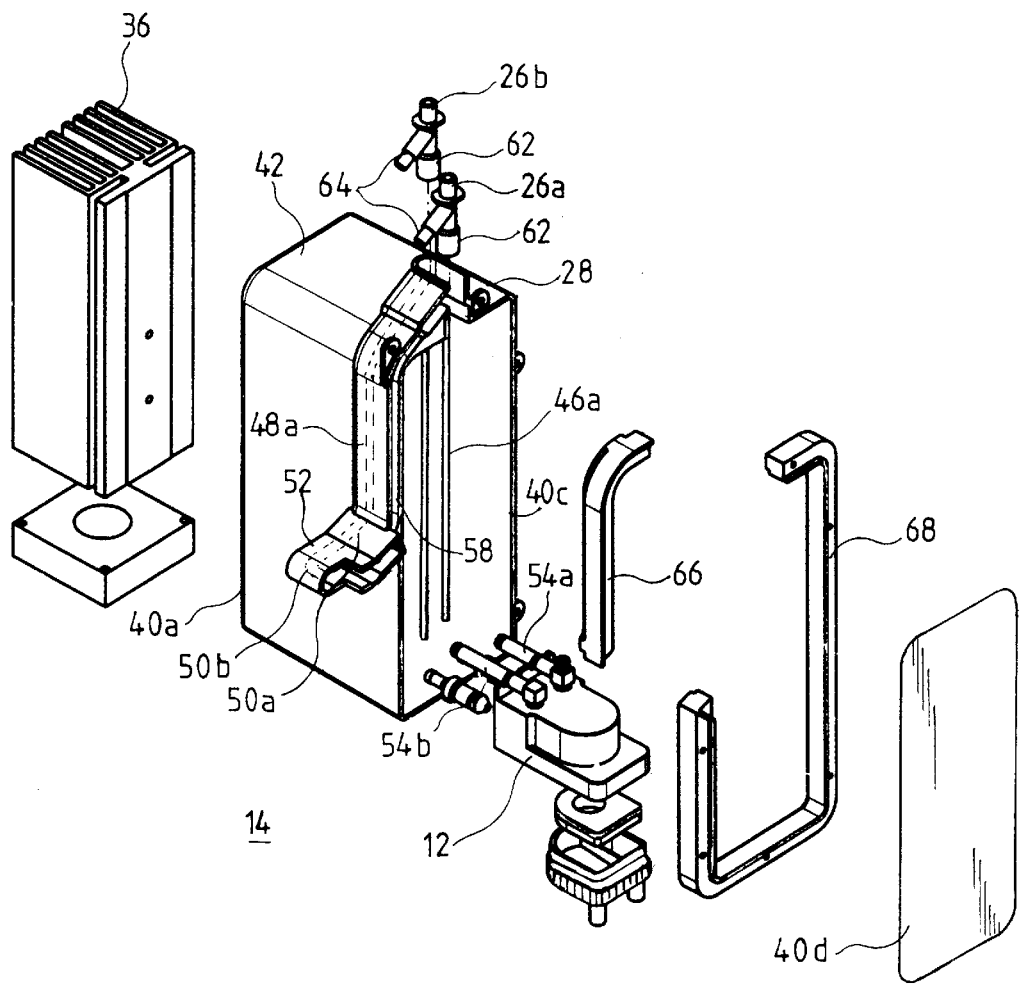
FIG. 2a is a perspective view of a partly exploded emulsifying assembly of the coffee apparatus according to FIG. 1.
Figure 2B:
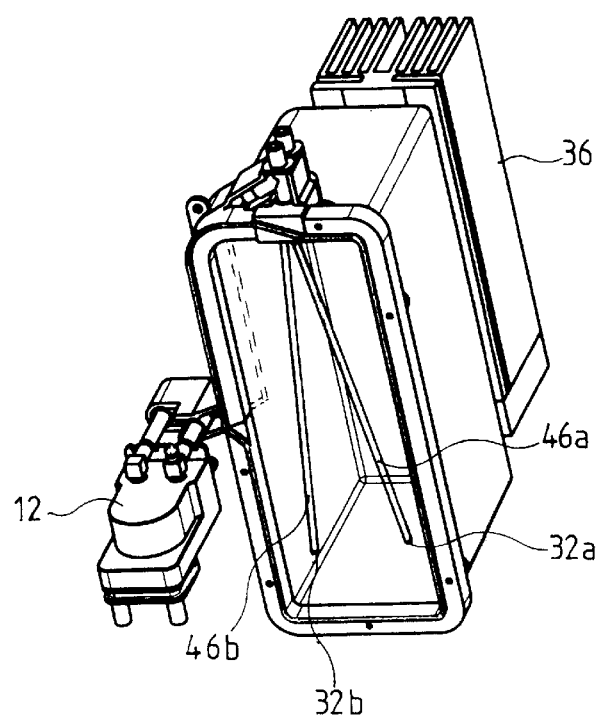
FIG. 2b is a three-dimensional view of the emulsifying assembly according to FIG. 2a, with a front wall removed.
Figure 2C:
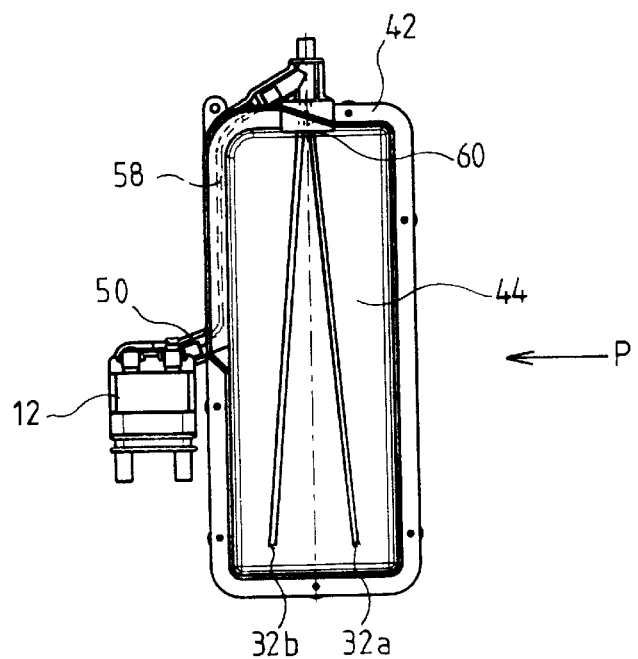
FIG. 2c is a front view of the emulsifying assembly according to FIG. 2b.
Figure 2D:
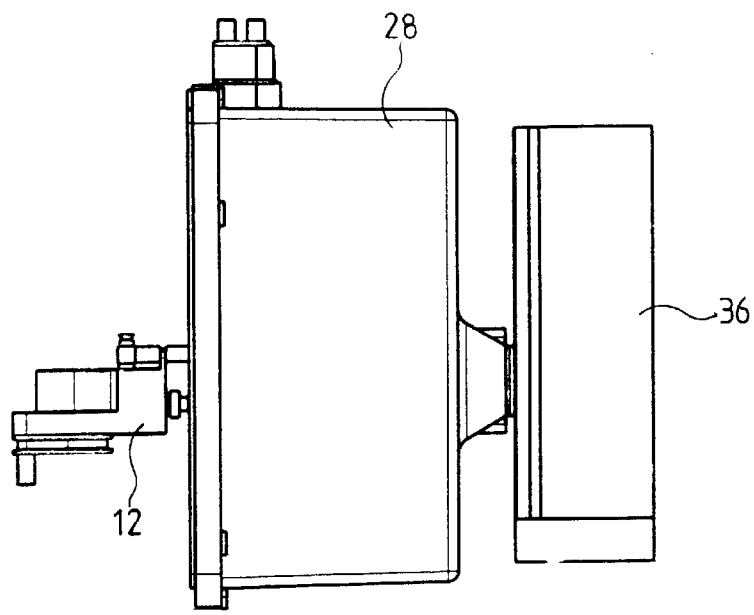
FIG. 2d is a side view in the direction of the arrow P of FIG. 2c.
Figure 2E:
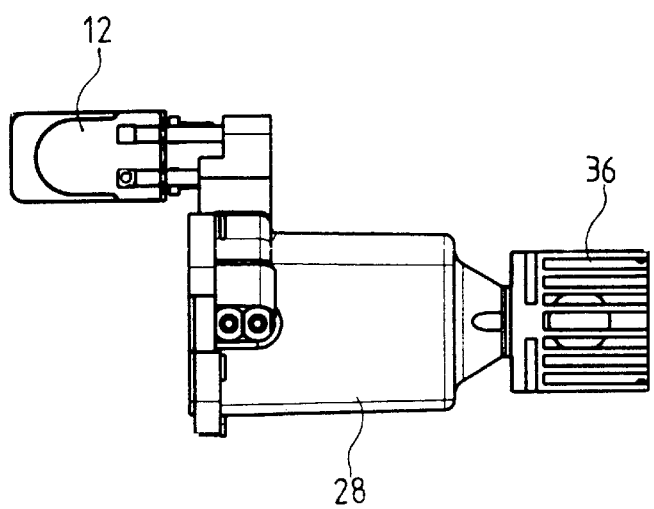

As can be suitably seen in FIGS. 2a, 2b and 2c, the first and second aeration valves 26a and 26b are arranged externally on the top wall 42. Extending vertically downwards from the first aeration valve 26a into the space 44 is a part 46a of the milk supply duct 15a. The part 46a of the milk supply duct is of flexible design, so that it can easily be manipulated in a carton of milk. Further, from the first aeration valve 26a a second part 48a of the milk supply duct 15a extends in a hollow space of the top wall 42 and the upright sidewall 40a. The upright sidewall 40a comprises externally thereof an outlet opening 50 through which the second part 48a of the duct 15a projects partly outside. The part of the duct 15a which projects outside ends in a first open end 50a. The open end 50a is situated in a holder 52 mounted on the upright sidewall 40a.

The first milk supply duct 15a accordingly comprises a first open end which in this example extends to a point outside the cooling unit 28 and a second open end situated in the interior 44 of the cooling unit 28. Inasmuch as the first part of the milk supply duct 15a extends substantially within the space 44, while the second part 48a of the duct 15a extends substantially through a hollow space in the chamber walls, the first milk supply duct 15a extends substantially inside the cooling unit.

The second milk supply duct 15b together with the second aeration valve 26b is mounted in the cooling unit 28 in a manner entirely analogous to that discussed in relation to the milk supply duct 15a.

The emulsifier 12 comprises a first milk inlet 54a, a second milk inlet 54b, a first steam inlet 56a and a second steam inlet 56b. The emulsifier 12 comprises a housing which is detachably connected to the cooling unit 28, in this case in particular detachably connected to the holder 52. FIG. 2a shows the emulsifier 12 when detached from the cooling unit 28. The other drawings of FIG. 2 show the emulsifier 12 when connected to the holder 52 of the cooling unit 28. In this last condition, the first open end 50a of the milk supply duct 15a is connected to the first milk inlet 54a. Also, the first open end 50b of the second milk supply duct 15b is connected to the second milk inlet 54b. The first steam inlet 56a and the second steam inlet 56b in use are connected to the first downstream duct 22 and the second downstream duct 24, respectively. See also FIG. 1. It is noted that the first and second milk inlet 54a, 54b of the emulsifier 12 are situated adjacent the cooling unit 28, so that the milk supply duct extends at least substantially completely inside the cooling unit (see also FIGS. 2b and 2c).

In this example, the first and second open end 50a and 50b of the milk supply ducts 15a and 15b are connected through a snap connection which is known per se to the first and second milk inlet 54a and 54b, respectively. The emulsifier 12 therefore can be pulled off the cooling unit, for instance to be cleaned, and subsequently be re-placed again.

FIG. 2a depicts the emulsifying assembly in partly disassembled condition. The hollow space extending in the top wall 42 and the sidewall 40a is designated with reference numeral 58. The top wall 42 is internally provided with an opening 60 through which the milk supply ducts 15a, 15b extend from the hollow space 58 in the wall 42 into the cooled space 44. In this example, the aeration valves 26a and 26b are assumed to be part of the milk supply ducts 15a and 15b. The opening 60 in this example extends from the inside of the cooling unit to the outside of the cooling unit (see FIG. 2a). These openings are closed again by the aeration valves when they are in assembled condition (see FIG. 2b). Each aeration valve comprises an inlet opening 62 and an outlet opening 64. The inlet openings 62 are respectively connected to the flexible parts 46a and 46b of the ducts 15a and 15b. The outlet openings 64 are connected to the parts 48a and 48b of the ducts 15a and 15b.

Because the hollow space 48, for the purpose of assembling the ducts, is open at the front of the cooling unit, the cooling unit further comprises a first insulating edge member 66 with which the hollow space 58 can be closed off. For the sake of symmetry, the cooling unit further comprises a second insulating edge member 68 which, in assembled condition, together with the first edge part, forms a closed ring. The milk supply ducts 15a and 15b are detachably connected to the rest of the assembly. By removing the first edge member 66, the milk supply ducts can be removed, for instance to clean or replace them. The upright sidewall 40d comprises means which are known per se, capable of detachably connecting it to the first and second edge member 66 and 68 in order to close off the cooling unit 28. Accordingly, the edge member 40d constitutes a kind of door which can be opened to place a carton of milk in the space 28 and which can subsequently be closed.

The cooling element 36 is likewise detachably connected to the cooling unit 28. Additionally, arranged at the lower end of the cooling element is a fan which has the function of cooling the cooling element.

The walls of the cooling unit 28 are substantially made of a metal. The cooling element is mounted on the wall 40b (see FIGS. 2b–2e). The cooling element accordingly cools the upright sidewall 40b directly. Inasmuch as all of the walls are made of metal and hence can conduct heat well, all of the walls will be cooled by the cooling element 36. The hollow space 58 will also be cooled. The duct parts 46a, 46b are obviously cooled because they are situated in the space 44. The holder 52 in this example is also made of metal, so that it is cooled too. This means that both milk supply ducts 15a and 15b in this example are cooled.

As appears from FIG. 2, the second ends 32a and 32b of the milk supply ducts 15a and 15b are situated at a level lower than the highest point of the respective milk supply ducts. The highest point of the milk supply ducts in this example is formed by the aeration valves 26a and 26b. Inasmuch as the second ends 32a and 32b are situated below the highest points referred to, the carton of milk 30 cannot drain of itself when the aeration valves are opened. In this example, both milk supply ducts are of substantially U-shaped design and so oriented that each milk supply duct extends in upward direction from the first and the second end, respectively. In this example, the aeration valves 26a and 26b are arranged at the highest point of the milk supply ducts 15a and 15b, respectively.

If with the aid of emulsifier 12 via the milk supply duct 15a or via the milk supply duct 15b milk being sucked in, the supply duct 15a, 15b will be filled entirely with milk. When thereupon suction is stopped, the liquid flow in the milk supply duct 15a, 15b comes to a standstill and liquid residues will be left behind in this duct. Now, the important purpose of the aeration valve is to prevent this. By opening the aeration valve 26a, 26b, the duct 15a, 15b is aerated and residues of liquid can flow back to the carton of milk 30 or flow further to the emulsifier 12. It is noted that for this function of the aeration valve it is not relevant where exactly in the milk supply duct 15a, 15b it is arranged. In other words, for the purpose of this function, the aeration valve can in principle be arranged at any point of the milk supply duct 15a, 15b.

In some embodiments, however, it is also desired to avoid siphon action. When, as described hereinabove, it is attempted to stop the milk flow through a milk supply duct 15a, 15b by ending suction of milk using the emulsifier 12, it is possible that the milk flow, even after suction has been stopped, is not ended owing to siphon action. Siphon action can occur in particular when the first end 50a, 50b, viewed in vertical direction, is lower than the height of the liquid level in the carton of milk 30. By opening the aeration valve 26a, 26b, the milk supply duct 15a, 15b will be aerated and the siphon action ended. It is noted that for the purpose of this function not any random position of the aeration valve 15a, 15b is permitted. When the aeration valve 15a, 15b is situated in the part 48a, 48b of the duct 15a, 15b, the aeration valve should be disposed at a height which, in use, is above the level of the liquid surface in the carton of milk 30. If this were not the case, the milk would flow out via the aeration valve itself. If, on the other hand, the aeration valve is arranged in the flexible part 46a, 46b of the duct 15a, 15b, it should for the same reason be arranged above the level of the liquid surface. In order to be able to properly fulfill both functions, the aeration valve will preferably be arranged at least at a level above the second end of the relevant milk supply duct. Ideally, however, as shown in FIG. 2, the aeration valve is disposed at the highest point of the milk supply duct in question, since it can then function properly at all times, regardless of the liquid level.

Referring to FIG. 3, now the emulsifier 12 will be further explained. The emulsifier, as already mentioned, comprises the first and second steam inlet 56a and 56b and a first and second milk inlet 54a and 54b. The emulsifier further comprises an air inlet 72 which in this example is in direct communication with the first milk inlet 54a. This air inlet 72 further comprises a controllable valve 74 for controlling the magnitude of the air stream through the air inlet 72.

The emulsifier further comprises a first suction chamber 76a and a second suction chamber 76b. The first and second suction chamber 76a and 76b are spatially separated from each other. The first steam inlet 56a opens into the first suction chamber 76a. The second steam inlet 56b opens into the second suction chamber 76b. The first milk inlet 54a and hence also the air inlet 72 likewise open into the first suction chamber 76a. The second milk inlet 54b opens into the second suction chamber 76b. Further, the first and second suction chamber 76a, 76b are in fluid contact via duct 77a and 77b, respectively, with a mixing chamber 78. The mixing chamber 78 comprises a bottom 80 which comprises an outlet in the form of an opening 82. Via this outlet 82, the mixing chamber 78 terminates in a distribution chamber 84 located under the mixing chamber. The distribution chamber 84 comprises a bottom with a first and second milk outflow channel 86a and 86b with, respectively, a first and a second milk outflow opening 88a, 88b.

Figure 3A:
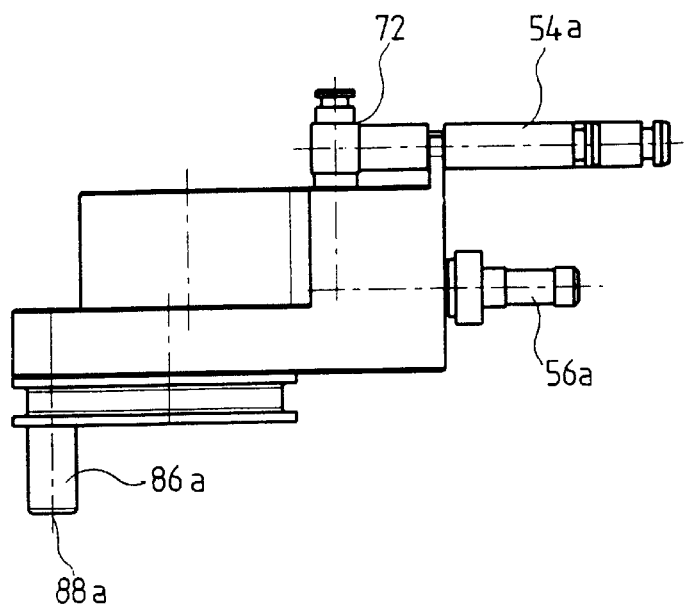
Figure 3B:
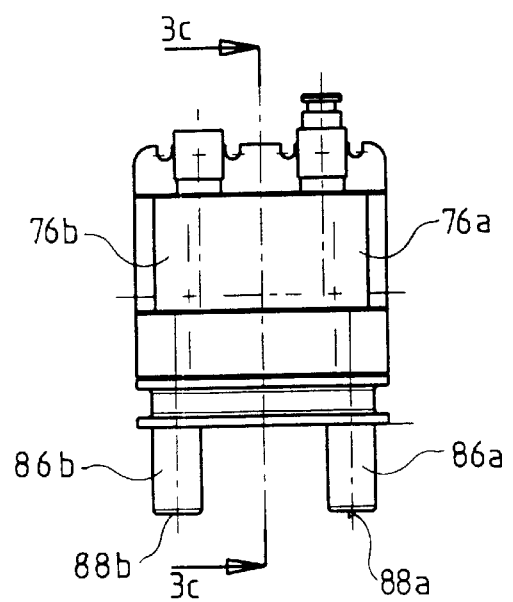
Figure 3C:
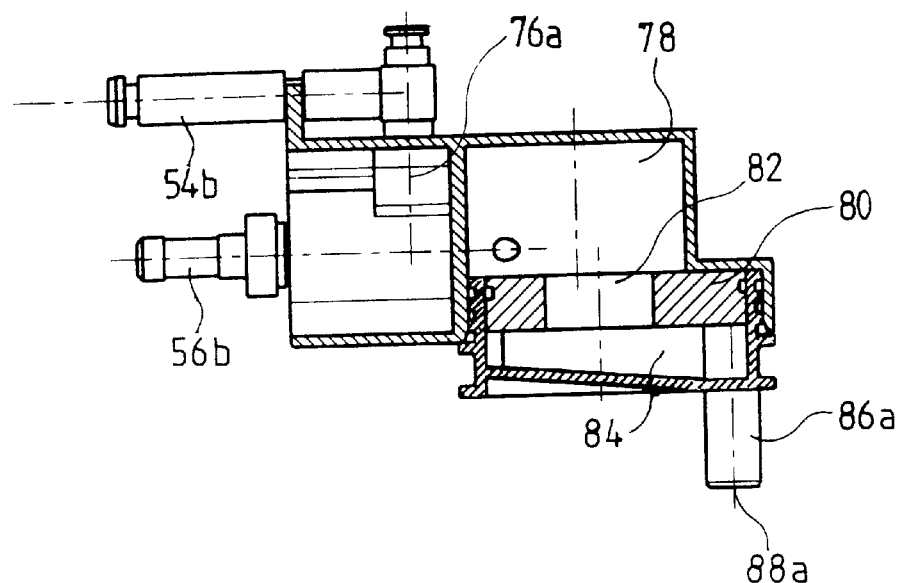
FIG. 3c is a cross section of the emulsifier taken on the line 3c—3c in FIG. 3b.
Figure 3D:
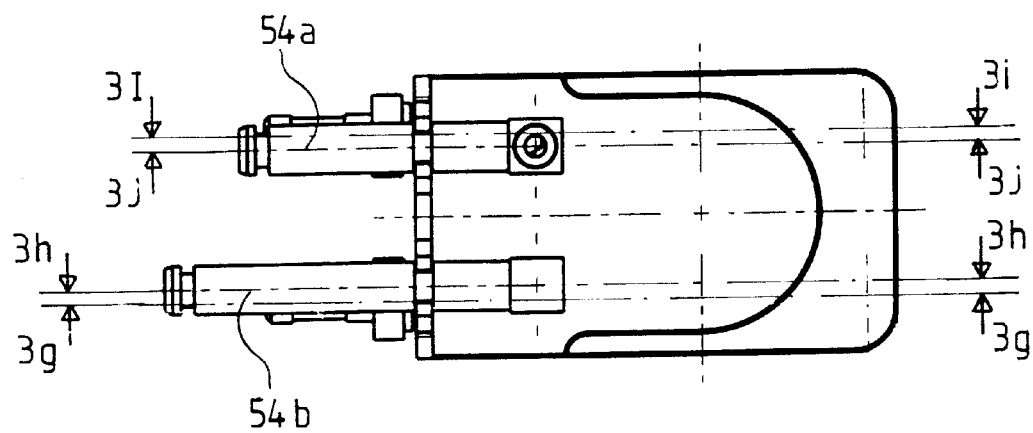
Figure 3E:
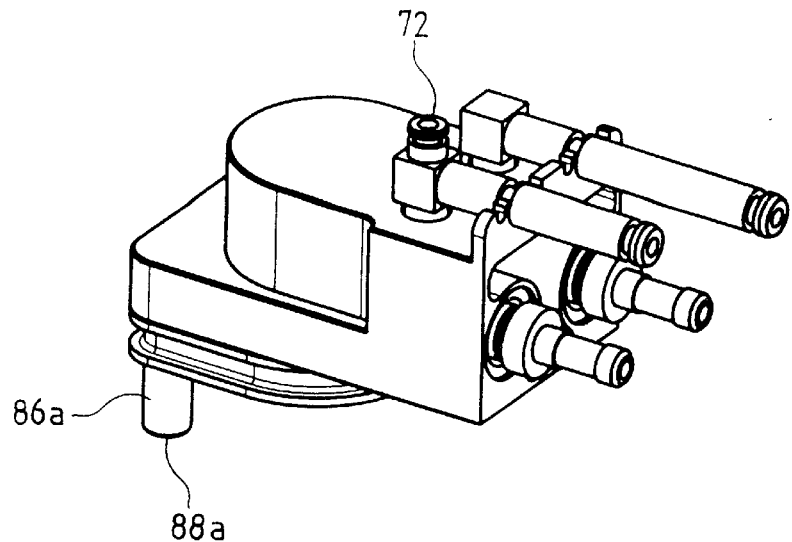
Figure 3F:
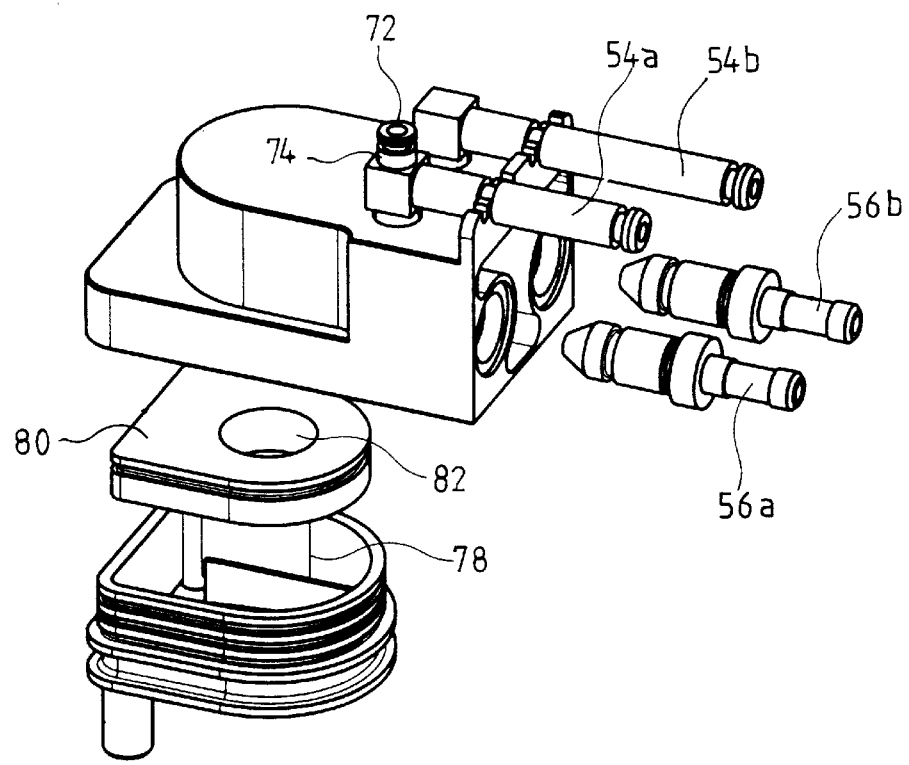
Figure 3G:
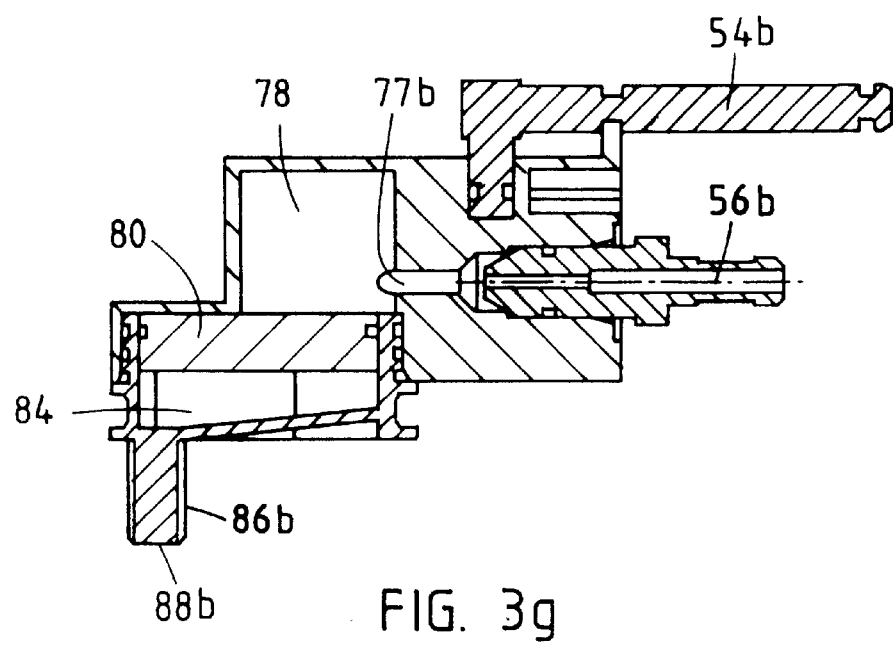
FIG. 3g is a first longitudinal section of the emulsifier taken on the line 3g—3g in FIG. 3d.
Figure 3H:
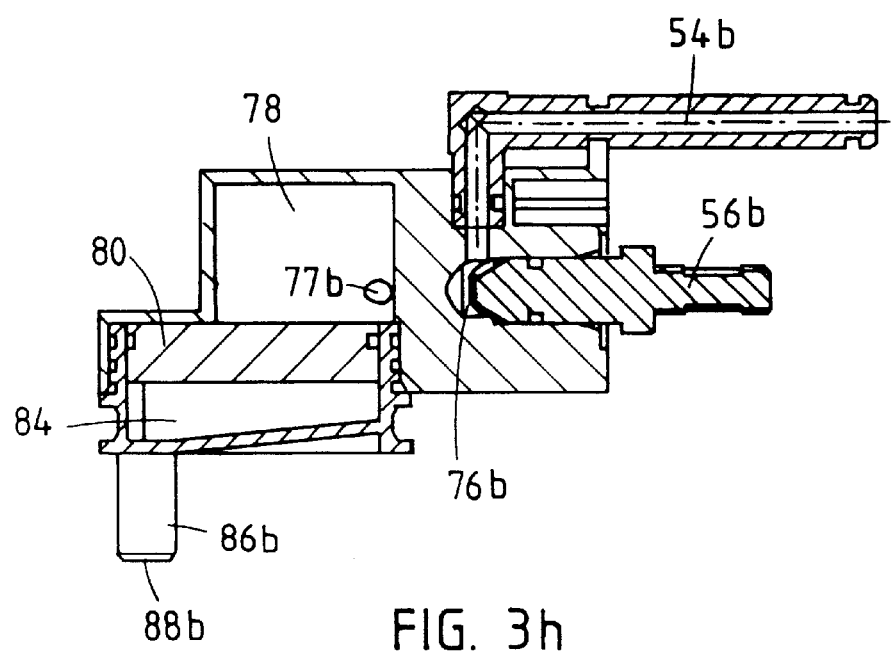
FIG. 3h is a second longitudinal section of the emulsifier taken on the line 3h—3h in FIG. 3d.
Figure 3I:
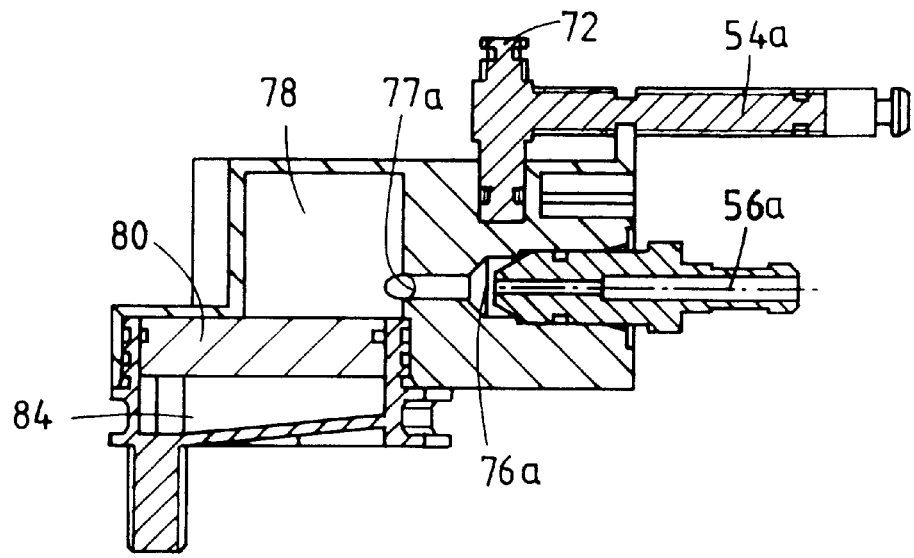
FIG. 3i is a third longitudinal section of the emulsifier taken on the line 3i—3i in FIG. 3d.
Figure 3J:
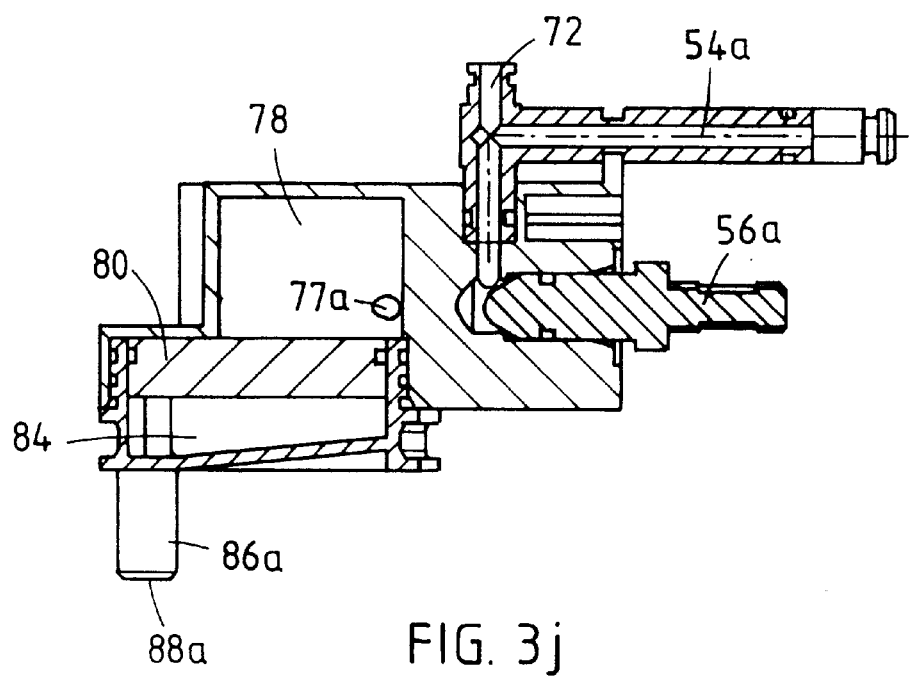
FIG. 3j is a fourth longitudinal section of the emulsifier taken on the line 3j—3j in FIG. 3d.

As can be seen in FIG. 3f, the first and second milk inlet, the first and second steam inlet, the mixing chamber 78, the distribution chamber 84 and the bottom 80 together with the other components of the emulsifier can be assembled from loose parts. However, this is not essential to the invention and only intended as an illustration of a possible embodiment.

The operation of the coffee apparatus is as follows. It is preliminarily remarked that in this example the first and second outflow 8, 10 of the discharge channel 6 and the first and second milk outflow opening 88*a* and 88*b* of the emulsifier 12 are arranged in such mutual proximity that they can all four of them dispense liquid directly into one cup. When it is presently the desire of the user to prepare a cup of cappuccino, the control unit 34 will activate the steam generator 16 for preparing steam. The steam is supplied via the steam duct 18 to the selection means 20. The control unit 34 controls the selection means 20 in such a manner that the steam is supplied only to the first downstream duct 22. Accordingly, no steam is supplied to the downstream duct 24. The result is that the first steam inlet 56*a* of the emulsifier 12 is supplied with steam. This steam will end up in the first suction chamber 76*a*. As a result, in this suction chamber a reduced pressure will arise since the suction chamber 76*a* will function as a venturi system. The result is that the first suction chamber 76*a* will draw in milk and air via the milk inlet 54*a* and the air inlet 72, respectively. The combination of milk, air and steam will thereupon flow at a high velocity to the mixing chamber 78, where the ingredients in question are properly mixed with each other. The bottom 80 with the opening 82 of the mixing chamber here functions as a "hold up" ensuring that the residence time of the mixture in the mixing chamber 78 is sufficiently long for the milk to be properly heated under the influence of the steam and to form froth under the influence of the air. The end result is that frothed milk is supplied to the distribution chamber 84. This frothed milk will leave the distribution chamber via the milk outlet openings 88*a* and 88*b* and fill a cup placed under these milk outlet openings. To control the nature of the frothed milk, the air stream can, if desired, be adjusted via the controllable valve 74. This can be done manually.

The control unit 34 will also activate the coffee unit 2. The activation of the coffee unit 2 can occur concurrently with the activation of the steam generator 16. It is also possible, however, first to activate the steam generator 16 and then the coffee unit 2 or first to activate the coffee unit 2 and then the steam generator 16. The order in which eventually the coffee extract and the frothed milk are dispensed into a cup can therefore be varied. When the coffee unit 2 is activated, it will prepare a coffee extract which flows via the drain channel 6 to the first and second outflow 8, 10. The coffee extract will be poured into the cup via the first and second outflow 8, 10. The cappuccino is presently ready for consumption.

If, however, it is intended that a cup of coffee is prepared which consists of coffee extract with hot milk which expressly does not froth (café au lait), the control unit 34 will again activate the steam generator 16 as described hereinbefore. Now, however, the control unit 34 controls the selection means 20 such that steam is fed to the second downstream duct 24 while no steam is fed to the first downstream duct 22. The result is that steam is fed solely to the second steam inlet 56*b* of the emulsifier 12. This steam will flow to the second suction chamber 76*b*. Thus in the second suction chamber 76*b*, which again functions as a venturi system, a reduced pressure will be created, so that milk is drawn in via the second milk inlet 54*b*. Because the second suction chamber 76*b* is separated from the first suction chamber 76*a*, no air will be sucked to the second suction chamber 76*b*. Accordingly, from the second suction chamber 76*b*, a mixture of milk and steam will flow to the mixing chamber 78. In the mixing chamber 78 too, no air will be sucked in via the air inlet 72, since in the mixing chamber 78 an excess pressure is created, so that it is not possible for liquid or air to flow from the first suction chamber to the mixing chamber. In the mixing chamber 78 the milk is thereupon heated properly with the steam, and the residence time of the milk in the mixing chamber will be sufficient for a considerable heat transfer between the steam and the milk. The bottom together with the opening 82 here functions as a "hold up" again. The hot milk will thereupon flow to the distribution chamber 84 and leave the distribution chamber, divided over the outlet openings 88*a* and 88*b*. The cup which has been placed under the milk outlet openings 88*a*, 88*b* will therefore be filled with a black coffee extract and hot milk which absolutely does not froth. It is noted that the emulsifier in this example is operated automatically, since through the selection of the steam inlet to which steam is supplied, a choice is made between the dispensing of hot non-frothed milk and hot frothed milk.

When, for instance, frothed milk has been dispensed, the control unit 34 will in any case open the aeration valve 26*a* and possibly also the aeration valve 26*b*. Also, the steam generator 16 is deactivated. This means that in this example no steam is supplied to the first suction chamber 76*a* anymore, so that the first suction chamber also will not suck in any milk anymore via the milk supply duct 15*a*. To prevent milk from continuing to flow through the milk supply duct 15*a* anyway as a result of siphon action, the control unit 34 opens the aeration valve 26*a*. It will be clear that when hot non-frothed milk has been dispensed, the control unit 34 activates the steam generator 16 and opens at least the aeration valve 26*b*.

When it is desired to heat up and/or clean the emulsifier 12, the control unit 34 opens the first and/or the second aeration valve 26*a*, 26*b*. Also, the steam generator 16 is activated. The selection means 20 is set such that steam is supplied to the first downstream duct when the aeration valve 26*a* is opened, to the second downstream duct when the aeration valve 26*b* is opened or to both downstream ducts when both aeration valves are opened. Assuming that both aeration valves are opened, the steam inlets 56*a* and 56*b* are accordingly supplied with steam. This steam will flow through to the first and second suction chamber 76*a* and 76*b*. However, because the aeration valves 26*a* and 26*b* are opened, the milk supply ducts 15*a* and 15*b* are aerated with the result that no milk is sucked from the carton 30. Instead, via the aeration valve 26*a* and 26*b*, air is sucked in, which flows to the first and second suction chambers 76*a* and 76*b*. The steam flows via the suction chamber to the mixing chamber, distribution chamber to subsequently leave the emulsifier via the milk outflow channels 86*a* and 86*b*. The result is that any milk residues that have been left in the emulsifier are entrained and carried off by the steam. Another result is that the emulsifier 12 is heated up. When the emulsifier is subsequently used for preparing hot frothed milk or hot milk, milk of a desired temperature will be dispensed directly without the temperature of the milk that is being dispensed running up slowly over time. Further, this milk will be entirely pure because the emulsifier has priorly been blown clean entirely.

It is noted that opening the aeration valves 26*a* and 26*b* after milk has been dispensed by the emulsifier is also advantageous in that any milk residues will drain from the milk supply ducts 15*a* and 15*b*. Thus, not only siphon action is prevented, but also milk residues are prevented from being left behind in the ducts in question.

Figures 4A, 4B, 4C:
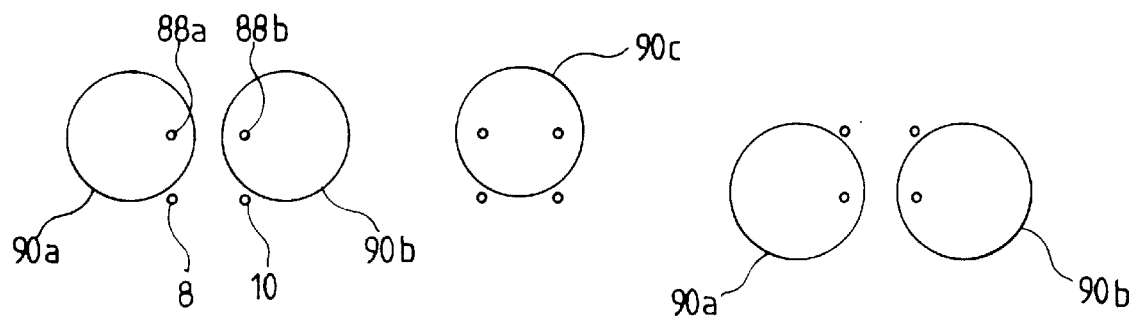
FIGS. 4a–4f show a possible use of the coffee apparatus according to FIG. 1.
Figures 4D, 4E, 4F:
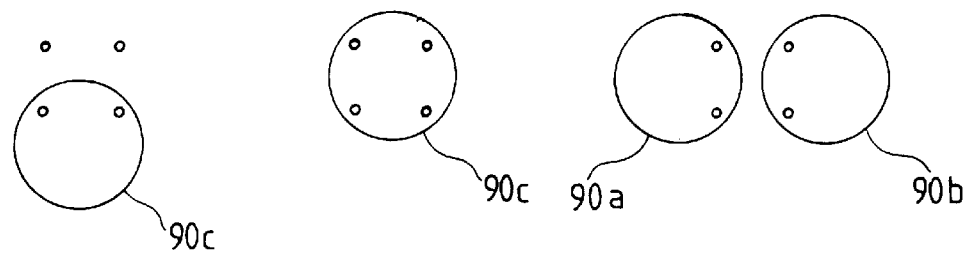
Figure 5A:
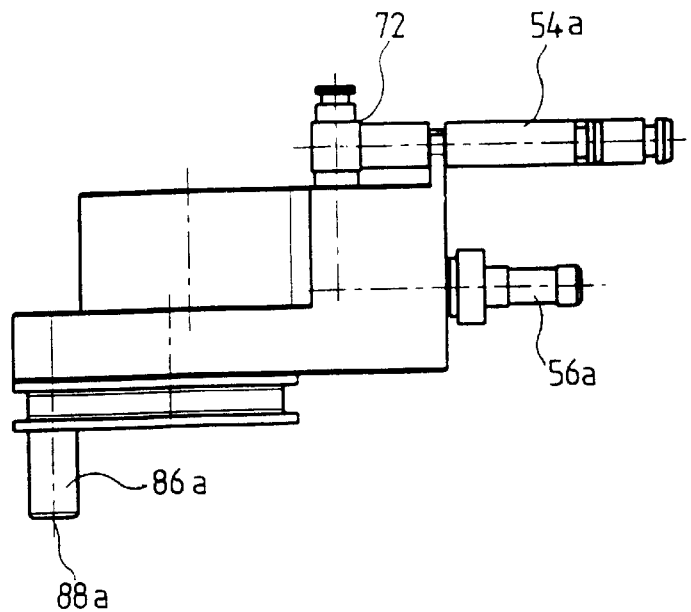
Figure 5B:
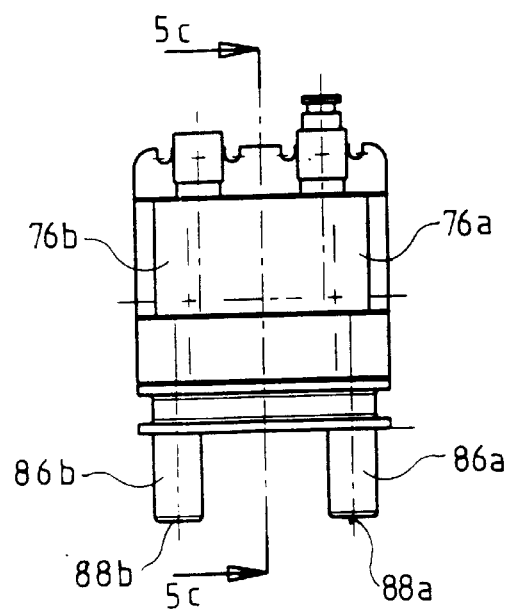
Figure 5C:
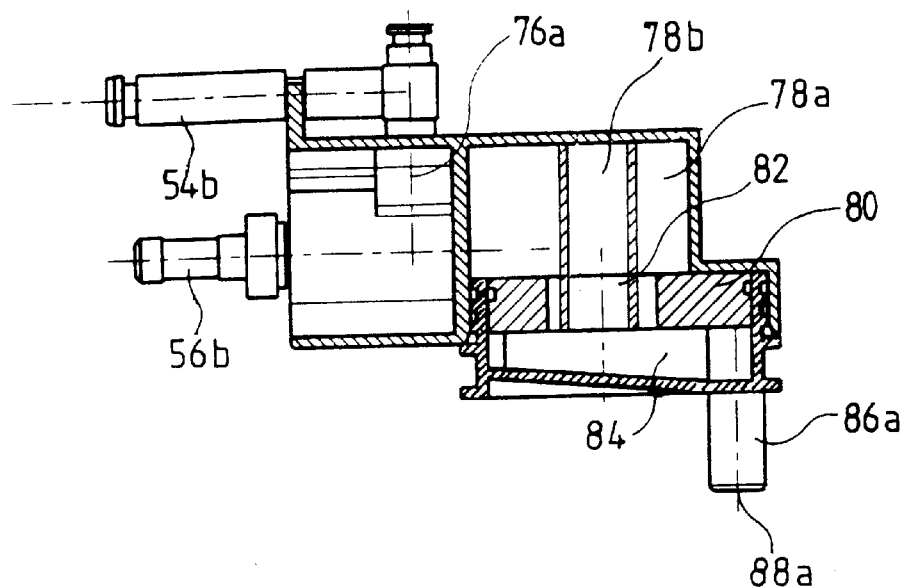
Figure 5D:
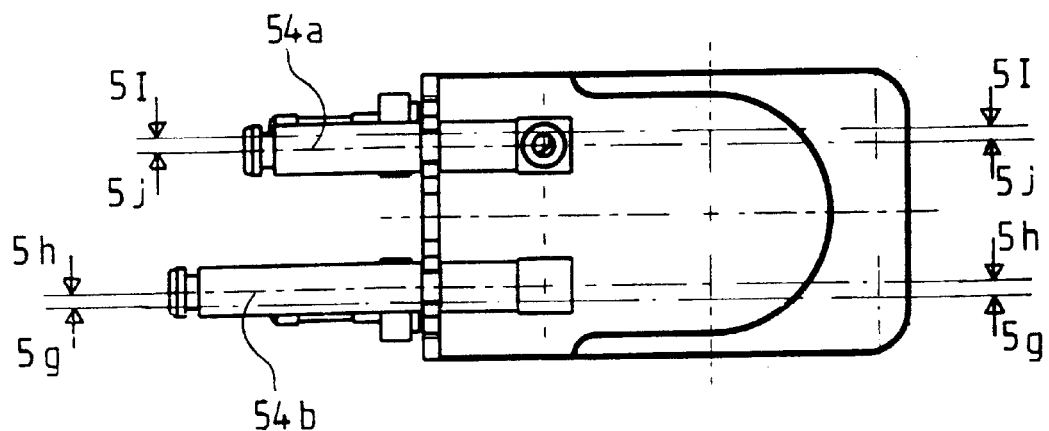
Figure 5E:
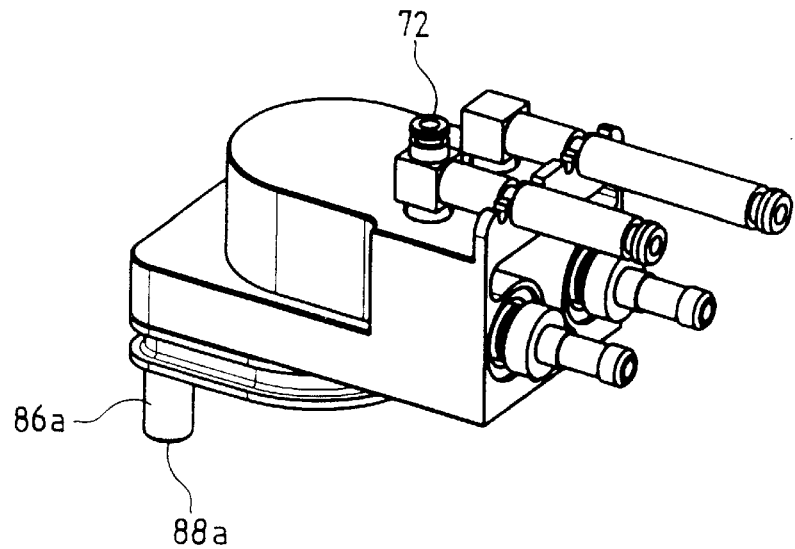
Figure 5F:
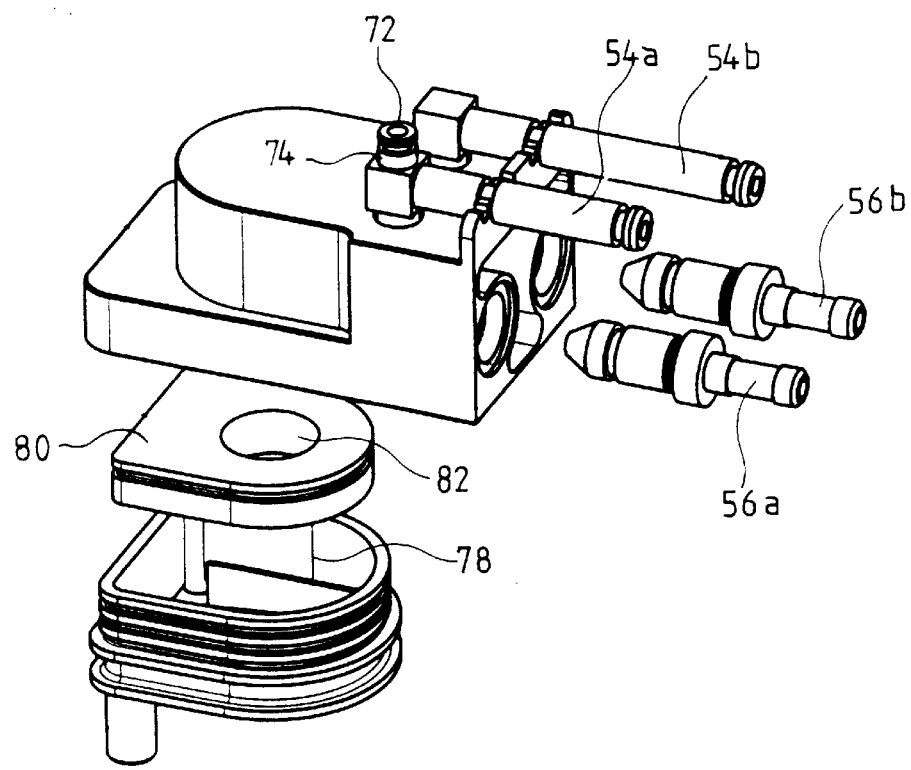
Figure 5G:
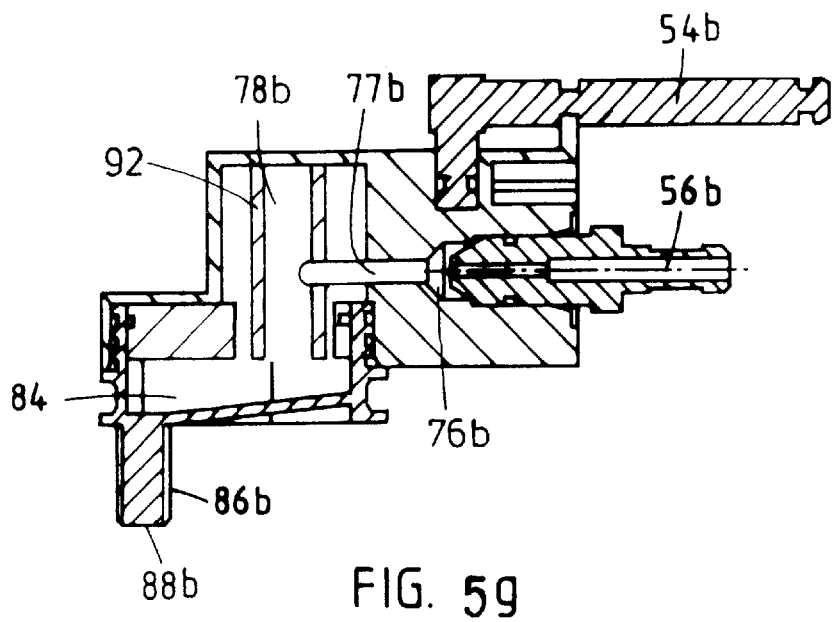
FIG. 5g is a first longitudinal section of the emulsifier taken on the line 5g—5g in FIG. 5d.
Figure 5H:
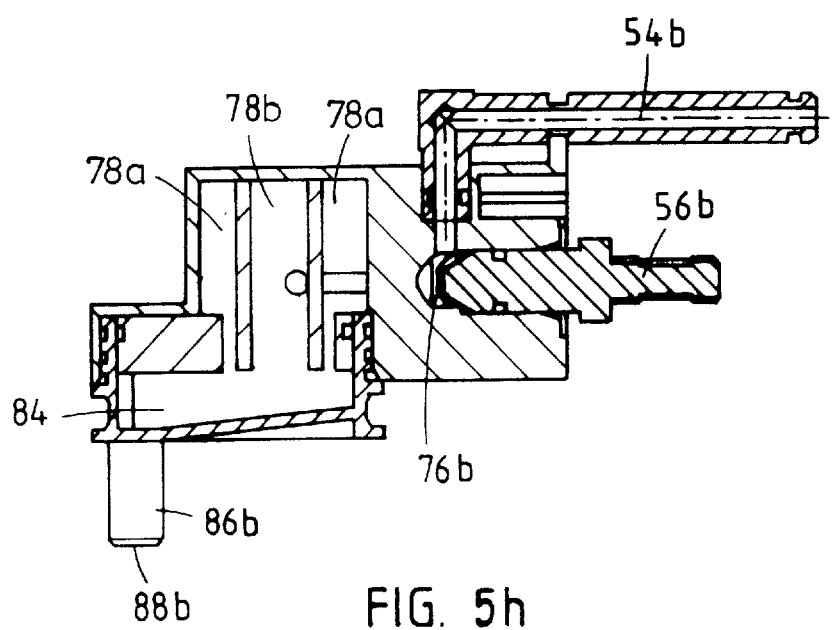
FIG. 5h is a second longitudinal section of the emulsifier taken on the line 5h—5h in FIG. 5d.
Figure 5I:
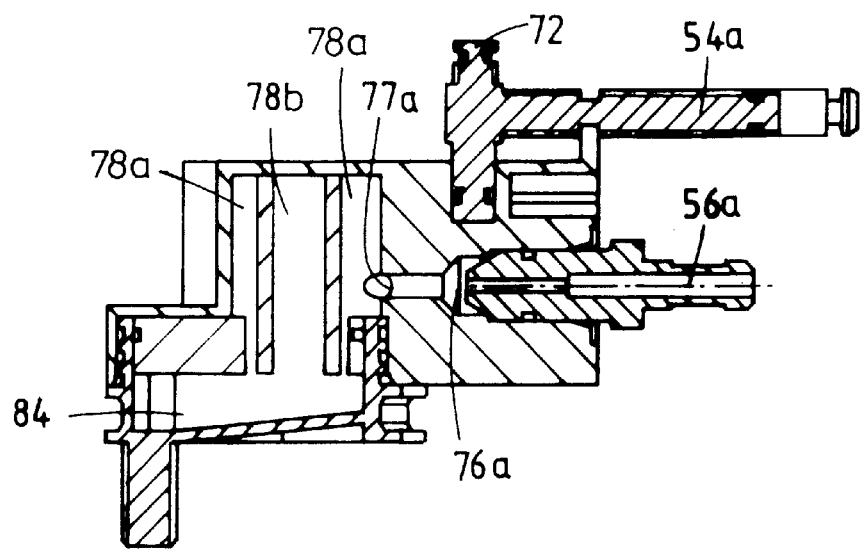
FIG. 5i is a third longitudinal section of the emulsifier taken on the line 5i—5i in FIG. 5d.
Figure 5J:
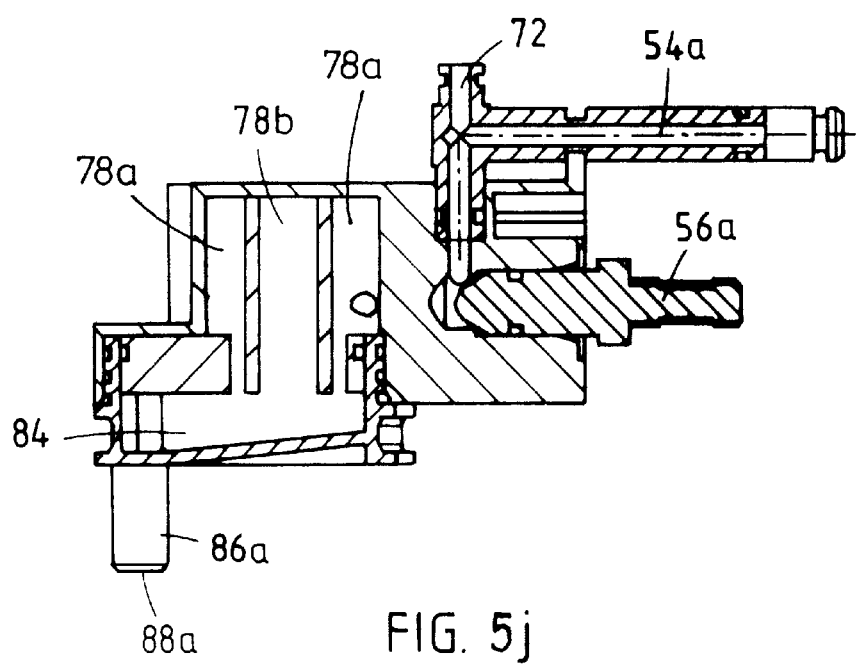
FIG. 5j is a fourth longitudinal section of the emulsifier taken on the line 5j—5j in FIG. 5d.

If desired, it is also possible to fill two cups with hot milk. In that case, a first cup 90a is placed under the milk outlet opening 88a and a second cup 90b under the milk outlet opening 88b (see FIG. 4a). However, the first and second milk outlet opening 88a and 88b are arranged so close to each other that milk can also be dispensed from both milk outlet openings directly into one cup 90c (see FIG. 4b). The same applies to the first and second outflow opening 8, 10 for the coffee extract. If it is desired to fill two cups 90a, 90b with coffee extract, the cup 90a can be placed under the coffee extract outflow opening 8, while the cup 90b can be arranged under the coffee extract outflow opening 10 (see FIG. 4c). However, the first and second coffee outflow opening are positioned so close to each other that coffee can be dispensed from both coffee outflow openings directly into a single cup (see FIG. 4d). Moreover, in this example the first milk outflow opening 88a and the first coffee outflow opening 8 are positioned so close to each other that milk and coffee can be dispensed from these openings directly into a cup 90a (see FIG. 4f). Moreover, the second milk outflow opening 88b and the second coffee outflow opening 10 are positioned so close to each other that milk and coffee can be dispensed from these openings directly into a second cup 90b (see FIG. 4f). In particular, the first and second milk outlet opening and the first and second coffee outflow opening are positioned so close to each other that via these openings coffee and milk can be dispensed directly into a cup 90c (see FIG. 4e). Thus, as desired, coffee extract can be supplied to one or two cups, hot non-frothed milk to one or two cups, hot frothed milk to one or two cups, coffee extract together with hot non-frothed milk to one or two cups, and coffee extract together with frothed hot milk to one or two cups. It will be clear that for the mere preparation of coffee extract or hot milk, the control unit 34 will activate only the coffee unit 1 or the steam generator 16.

FIGS. 5a–5j show a second possible embodiment of an emulsifier according to the invention, in which parts corresponding with FIG. 3 have been given the same reference numerals as in FIG. 3. Unlike the emulsifier of FIG. 3, the emulsifier according to FIG. 5 comprises a first and second mixing chamber 78a and 78b. The first suction chamber 76a is in fluid communication with the first mixing chamber 78a. Further, the second suction chamber 76b is in fluid communication with the second mixing chamber 78b. The second suction chamber 78b is bounded by a tubular upright wall 92. The second mixing chamber 78b is open at its underside and opens into the distribution chamber 84. Arranged on the outside of the second mixing chamber is the first mixing chamber 78a. The two mixing chambers are therefore concentric. The second mixing chamber 78b is likewise open at its underside and likewise opens into the distribution chamber 84. The second suction chamber 76b is in fluid communication with the second mixing chamber 78b through a duct 77b. Similarly, the first suction chamber 76a is in fluid communication with the first mixing chamber 78a via a duct 77a. Inasmuch as the first and second mixing chambers 78a and 78b are mutually separate, the possibility of air being sucked into the second mixing chamber 78b through the air inlet 72 is entirely precluded. In other words, in the second mixing chamber 78b no frothed milk can be generated. Nor can the milk be blown back into ducts which are not being used at that time. It is also possible to control the temperature of the dispensed milk and the frothed milk by controlling a passage diameter of the respective milk supply ducts 21, 24.

The invention is not in any way limited to the above-described embodiment, so that all obvious variants are understood to fall within the scope of the invention.

What is claimed is:

1. An assembly for preparing hot milk, more particularly for preparing frothed milk, comprising at least one milk supply duct with a first and second open end, a high point and a mixing device for mixing steam and milk, the mixing device having at least one steam inlet, at least one milk inlet and an outlet, the first open end of the at least one milk supply duct being connected to the at least one milk inlet, and the second open end of the at least one milk supply duct being situated at a height lower than the high point, the second open end of the at least one milk supply duct being in fluid communication with a milk container, wherein the assembly further has at least one aeration valve having an open, position and being connected to the at least one milk supply duct, the at least one milk supply duct being aerated when the aeration valve is in the open position.

2. An assembly according to claim 1, wherein the aeration valve is at a height above a level of a liquid surface of the milk container.

3. An assembly according to claim 1, wherein the at least one milk supply duct is substantially U-shaped and the milk supply duct extends in upward direction from the first and the second open end, respectively.

4. An assembly according to claim 1, wherein the at least one aeration valve is at a height above the second open end of the at least one milk supply duct.

5. An assembly according to claim 4, wherein the at least one aeration valve is at the highest point of the at least one milk supply duct.

6. An assembly according to claim 1, wherein the at least one aeration valve is controllable with a control signal.

7. An assembly according to claim 1, wherein the assembly further includes a cooling unit comprising a cooled space surrounded by chamber walls, in which space said milk container can be placed, while the at least one milk supply duct extends substantially within the cooling unit.

8. An assembly according to claim 7, wherein the mixing device comprises a housing which is connected to an outer side of the cooling unit.

9. An assembly according to claim 8, wherein said housing is detachably connected to the cooling unit.

10. An assembly according to claim 7, wherein a portion of the at least one milk supply duct between the second open end and the at least one aeration valve extends substantially through a hollow space in the chamber walls.

11. An assembly according to claim 10, wherein the cooling unit comprised a bottom wall, upright sidewalls and a top wall, the at east one aeration valve is on the top wall, and the at least one milk supply duct extends from the at least one aeration valve through the top wall and at least one of the upright sidewalls.

12. An assembly according to claim 11, wherein one of said upright sidewalls has an outlet opening through which the milk inlet is connected to the second open end of the at least one milk supply duct.

13. An assembly according to claim 12, wherein the milk inlet of the mixing device is adjacent the cooling unit, so that the milk supply duct extends substantially completely inside the cooling unit.

14. An assembly according to claim 11, wherein one of said walls of the cooling unit is provided with an internal opening through which the at least one milk supply duct extends from the hollow space in this wall into the cooled space, and the first open end of the at least one milk supply duct is in fluid communication with the milk container.

15. An assembly according to claim 8, wherein the walls of the cooling unit are substantially made of a metal.

16. An assembly according to claim 15, wherein the assembly further includes a cooling element for cooling the walls of the cooling unit.

17. An assembly according to claim 1, wherein the mixing device comprises an emulsifier which has a first and second steam inlet, a first and second milk inlet, a first and second suction chamber, an air inlet and at least one mixing chamber, while the first steam inlet, the air inlet and the first milk inlet open into the first suction chamber, the first suction chamber is in fluid communication with the mixing chamber for preparing hot, frothed milk under supply of steam to the first steam inlet, while the second steam inlet and the second milk inlet open into the second suction chamber for preparing hot, non frothed milk under supply of steam to the second steam inlet.

18. An assembly according to claim 17, wherein the emulsifier comprises at least two milk supply ducts, of which a first and second milk supply ducts are connected to the first and second milk inlet, respectively.

19. An assembly according to claim 18, wherein the first and second milk supply duct comprise a first and second aeration valve, respectively, while the second open end of the first milk supply duct and the second open end of the second milk supply duct are respectively located at a height lower than said high point, and the first and second open end are each in fluid communication with a milk container.

20. An assembly according to claim 1, wherein the assembly further comprises a steam generator which is connected to the steam inlet, and a control unit which controls the aeration valve and the steam generator.

21. An assembly, according to claim 20, wherein the control unit, for the purpose of preparing heated milk, closes the aeration valve, so that the milk supply duct is not aerated by the aeration valve, and activates the steam generator for supplying steam to the mixing device.

22. An assembly, according to claim 20, wherein the control unit, before heated milk is dispensed, opens the aeration valve and activates the steam generator for supplying steam to the mixing device without milk being sucked in through the milk supply duct.

23. An assembly, according to claim 20, wherein the control unit, after a desired amount of heated milk has been dispensed, deactivates the steam generator and opens the aeration valve for aerating the milk supply duct to prevent siphon action through the milk supply duct.

24. An assembly for preparing hot milk, more particularly for preparing frothed milk, comprising a cooling device in which a milk-filled container can be arranged for dispensing cooled milk, a mixing device with at least one steam inlet and a milk inlet, to which, in use, steam and milk, respectively, are supplied for obtaining heated milk, and an outlet for dispensing the milk heated with the steam, the assembly and second open end, the first open end being connected to the milk inlet, and the second open end is in fluid communication with the milk in the container, wherein the cooling device includes a cooling unit comprising a cooled space surrounded by chamber walls, in which space said milk container can be placed, while the at least one milk supply duct extends substantially inside the cooling unit.

25. An assembly according to claim 24, wherein the mixing device comprises a housing connected to an outer side of the cooling unit.

26. An assembly according to claim 25, wherein said housing is detachable connected to the cooling device.

27. An assembly according to claim 24, wherein a part of the at least one milk supply duct extends substantially through a hollow space in the chamber walls.

28. An assembly according to claim 27, wherein the cooling unit comprises a bottom wall, upright sidewalls and a tope wall, while said part of the at least one milk supply duct extends through at least a part of the top wall and at least a part of the upright sidewalls.

29. An assembly according to claim 28, wherein one of said upright sidewalls has an outlet opening through which the milk inlet is connected to the second open end of the at least one milk supply duct.

30. An assembly according to claim 29, wherein the milk outlet of the mixing device is located adjacent the cooling unit, so that the milk supply duct extends at least almost completely inside the cooling unit.

31. An assembly according to claim 28, wherein one of said walls of the cooling unit is internally provided with an opening through which the at least one milk supply duct extends from the hollow space in this wall into the cooled space, so that the first open end of the at least one milk supply duct is in fluid communication with the milk container.

32. An assembly according to claim 25, wherein the walls of the cooling unit are made substantially of a metal.

33. An assembly according to claim 32, wherein the cooling device further comprises a cooling element for cooling the walls of the cooling unit.

34. An assembly according to claim 24, wherein the at least one milk supply duct is of substantially U-shaped design and extends in upward direction from the first and the second end, respectively.

35. An assembly according to claim 24, wherein the at least one milk supply duct is detachably connected to the assembly.

* * * * *